Sept. 3, 1935.   J. LUTON   2,013,277
APPARATUS FOR MAKING MOLDS
Filed July 25, 1933   4 Sheets-Sheet 1
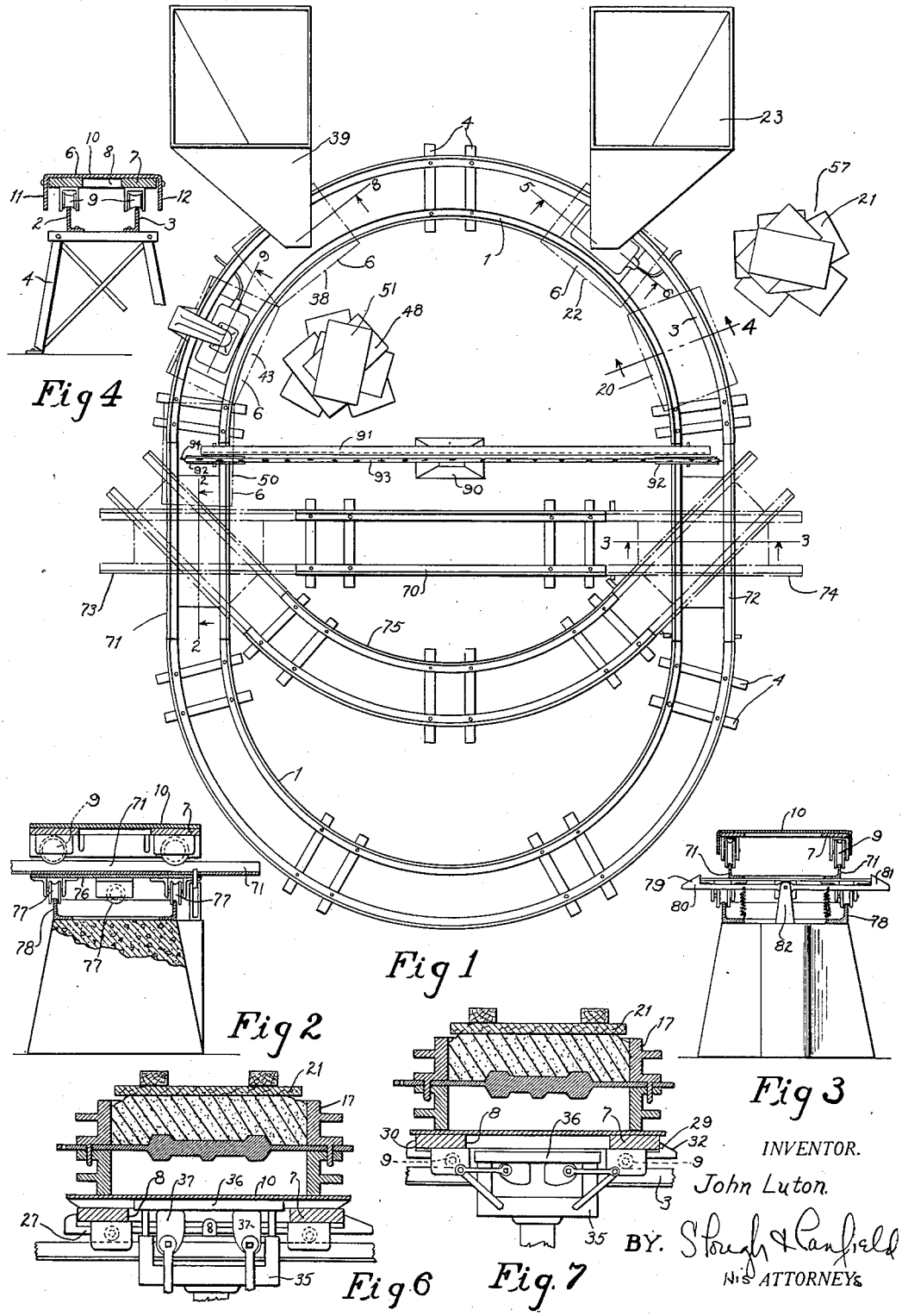
INVENTOR.
John Luton.
BY Stough & Canfield
His ATTORNEYs Sept. 3, 1935.    J. LUTON    2,013,277
APPARATUS FOR MAKING MOLDS
Filed July 25, 1933    4 Sheets-Sheet 2
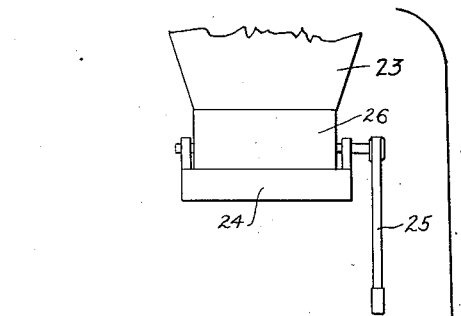
Fig.5.
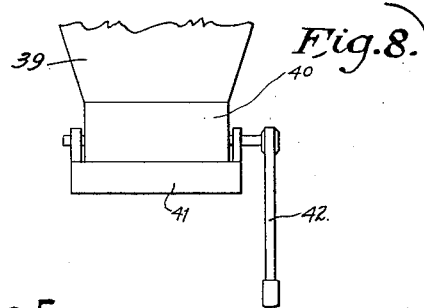
Fig.8.
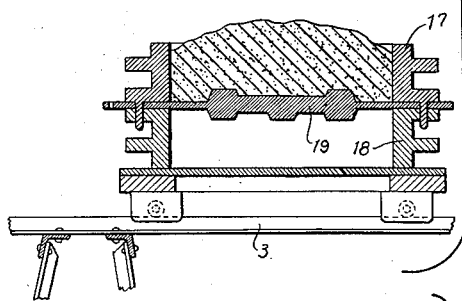
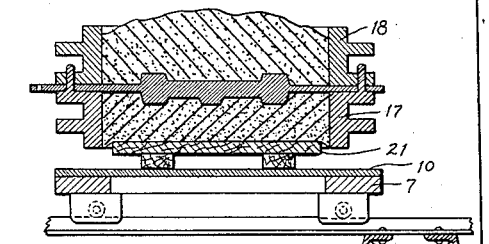
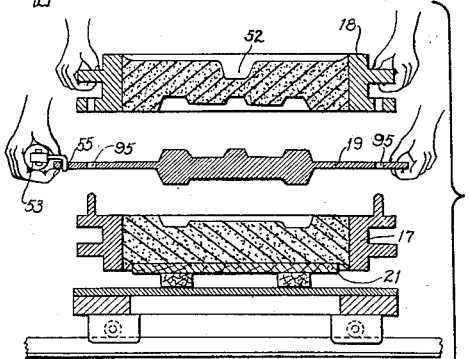
Fig.11.
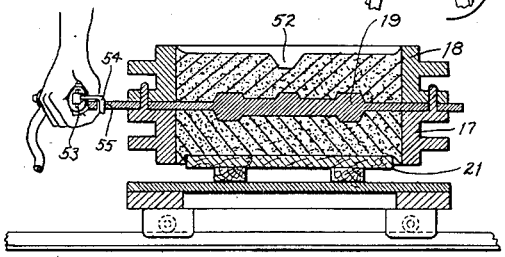
Fig.10.
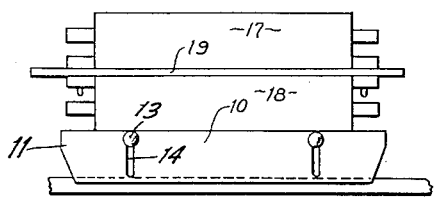
Fig.20.
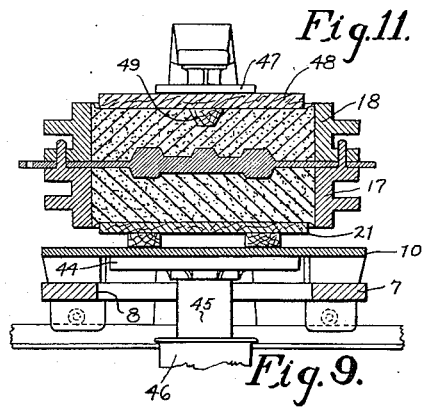
Fig.9.
INVENTOR.
John Luton.
BY Stough & Canfield
His ATTORNEYS

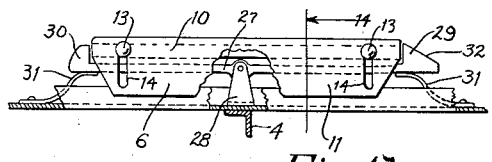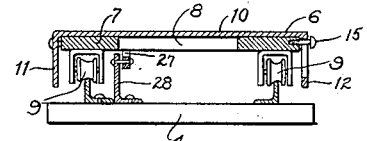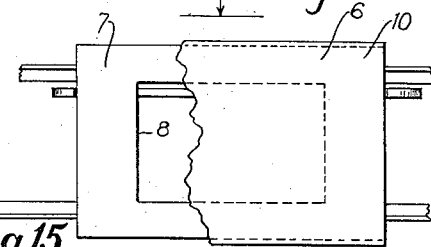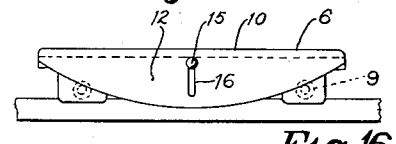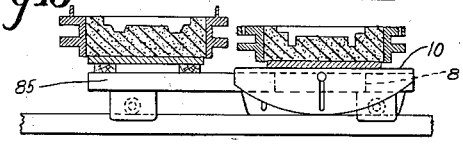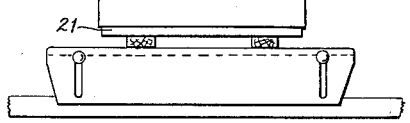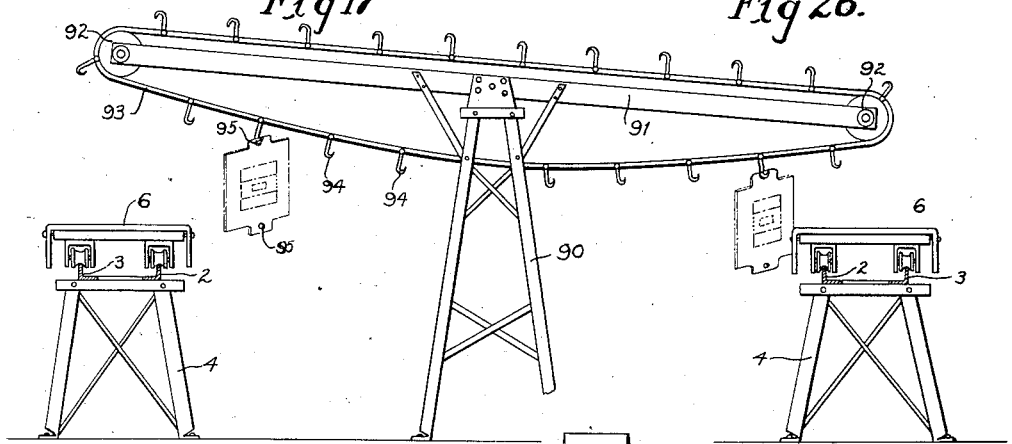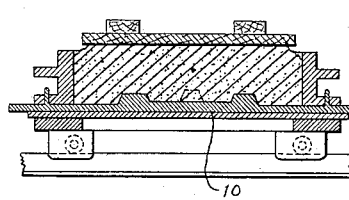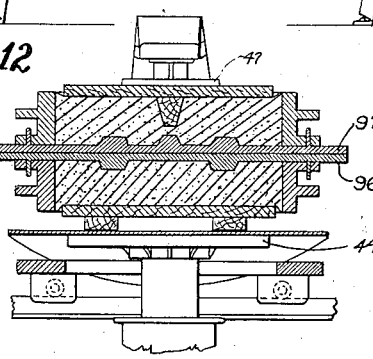

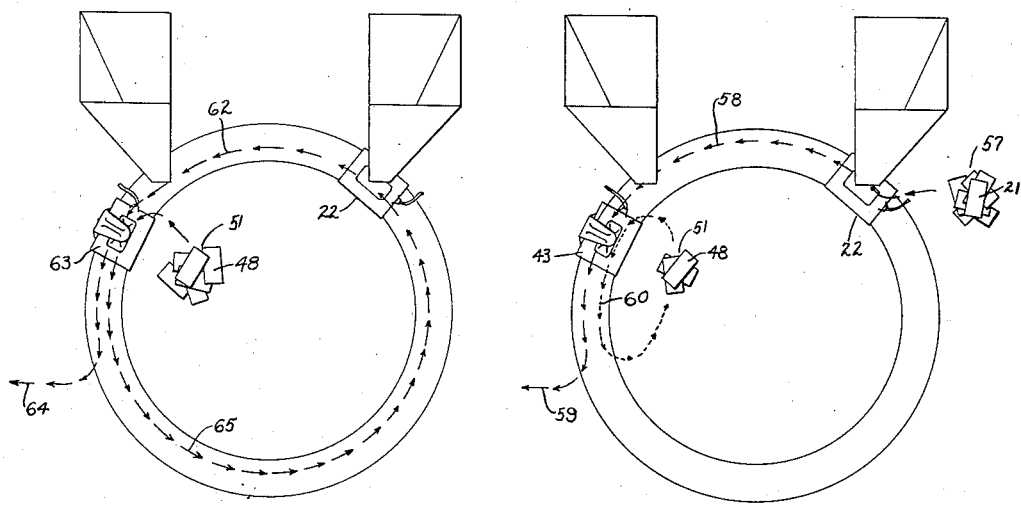
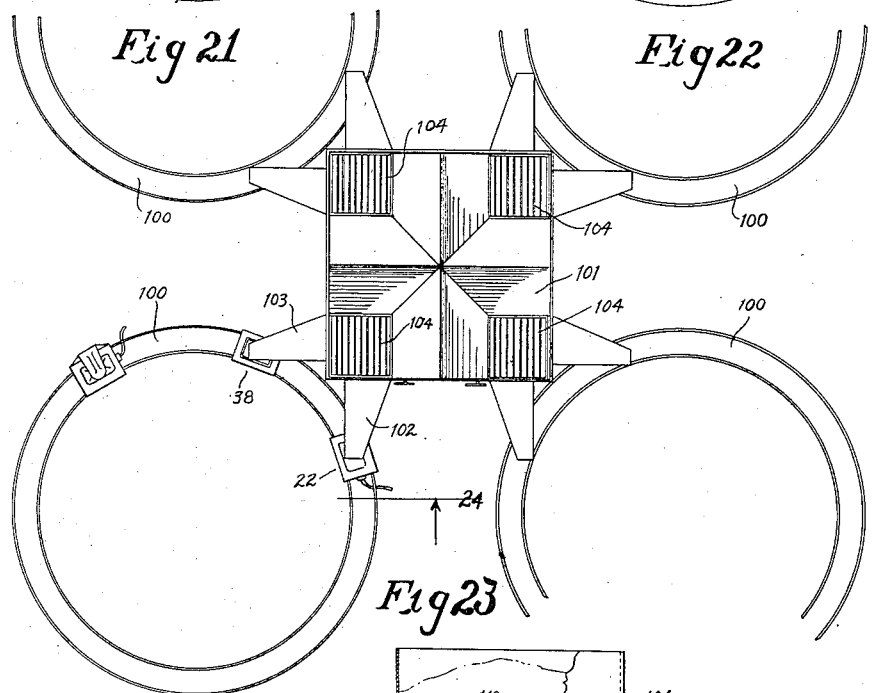
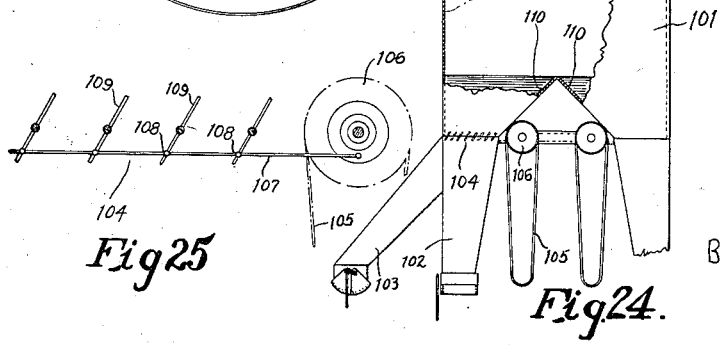

Patented Sept. 3, 1935

2,013,277

UNITED STATES PATENT OFFICE 2,013,277

APPARATUS FOR MAKING MOLDS

John Luton, Cleveland Heights, Ohio, assignor to Consolidated Iron-Steel Mfg. Company of 1932, Cleveland, Ohio, a corporation of Ohio Application July 25, 1933, Serial No. 682,137

7 Claims. (Cl. 22—20)

This invention relates to the art of founding and particularly to methods and apparatus for making molds from sand or the like for casting in metal.

It is one of the objects of this invention to provide an apparatus and method for producing molds by which a saving in the time and/or in the labor costs thereof as compared with prior methods and apparatus may be effected.

Another object is to provide a method and apparatus for producing molds in which a division of labor may be effected, the necessary operations to produce a mold being divided up among a plurality of laborers instead of all being performed successively by a single laborer.

Another object is to provide an apparatus and method for producing molds wherein molds may be produced by relatively unskilled labor or labor less skilled than has heretofore been necessary.

Another object is to provide an apparatus and method for producing molds whereby the making of molds may be carried on in a continuously repeating cycle of operations from a plurality of patterns.

Another object is to provide an improved mold making method and apparatus of the general class in which elements of the apparatus have a circulating traveling movement around a closed path such as a trackway or the like.

Another object is to provide a molding and apparatus of the general class referred to having an improved carriage for circulating on a trackway.

Another object is to provide, in a method and apparatus of the general class referred to, an improved means for stopping the circulating movement of a carriage or the like on a trackway at predetermined points in its circulating path of movement.

Another object is to provide, for a method and apparatus of the general class referred to, an improved method and means for circulating molding flask boards through the molding process.

Another object is to provide, in a method and apparatus of the general class referred to, an improved means providing for the insertion of cores in molds being made.

Another object is to provide, in a molding method and apparatus of the general class referred to, a trackway or the like having improved branched mold-accumulating track portions whereby molds being made may be circulated through the system at a slower rate on some portions of the closed trackway than upon others.

Another object is to provide, in connection with a molding method and apparatus of the general class referred to, an improved means for supplying molding sand to flasks for making molds therein.

Other objects will be apparent to those skilled in the art to which my invention appertains.

My invention is fully disclosed in the following description taken in connection with the accompanying drawings, in which:

Fig. 1 is a top plan view, greatly simplified, and in some respects diagrammatic, of a molding apparatus embodying a preferred form of my invention;

Fig. 2 is a sectional view taken from the plane 2—2 of Fig. 1 and illustrating a turntable trackway switching construction which I may employ;

Fig. 3 is a sectional view of parts of Fig. 1, drawn to a larger scale, taken from the plane 3—3 thereof;

Fig. 4 is a fragmentary sectional view taken from the plane 4 of Fig. 1 and drawn to a larger scale;

Fig. 5 is a sectional view to an enlarged scale taken from the plane 5 of Fig. 1 and illustrating one of the operations of making a mold according to my invention;

Fig. 6 is a view to an enlarged scale taken from the plane 6 of Fig. 1 illustrating a jolting operation which I may perform;

Fig. 7 is a view similar to Fig. 6 illustrating parts thereof in different positions;

Fig. 8 is a view similar to Fig. 5 but taken from the plane 8 of Fig. 1 and illustrating another operation which I may perform;

Fig. 9 is a view to an enlarged scale taken from the plane 9 of Fig. 1 and illustrating a squeezing operation which I may perform;

Figs. 10 and 11 are views similar to Fig. 9 but illustrating the operation of removing a pattern from the mold which has been squeezed as illustrated in Fig. 9;

Fig. 12 is a sectional view to an enlarged scale taken from the plane 12 of Fig. 1 and illustrating a pattern conveying mechanism which I may employ;

Fig. 13 is a fragmentary view illustrating an improved carriage element of apparatus which I may employ and an improved positioning or stop means therefor;

Fig. 14 is a sectional view taken from the plane 14 of Fig. 13;

Fig. 15 is a plan view of the parts of Figs. 13;

Fig. 16 is an elevational view taken from the plane 16 of Fig. 15;

Fig. 17 is a view generally similar to Figs. 13 to 16 inclusive but illustrating a modified form of carriage which I may employ;

Figs. 18, 19, and 27 are views similar to Figs. 5 to 9 inclusive, illustrating another method or series of operations which I may employ;

Fig. 20 is a view similar to Fig. 10 but with parts thereof illustrated in elevation;

Figs. 21 and 22 illustrate optional methods of circulating molding flask boards through the molding system of my invention;

Fig. 23 is a plan view illustrating to a reduced scale and in simplified diagrammatic form, a multiplex modification of the embodiment of my invention of Fig. 1 and having associated therewith an improved sand distributing mechanism;

Fig. 24 is a fragmentary view taken from the plane 24 of Fig. 23, illustrating a sand controlling valve mechanism which I may employ;

Fig. 25 is a view to an enlarged scale of a part of Fig. 24.

Fig. 26 is a view illustrating a mold completed according to my invention.

The subject matter of this application is a continuation in part of the subject matter of my Patent No. 1,924,081, issued August 27, 1933, on Methods and apparatus for making molds.

Referring to the drawings, Fig. 1, I have shown generally at 1 a trackway comprising a pair of spaced rails 2 and 3 secured to and supported upon a plurality of trestles 4, 4. The trackway illustrated is generally oval in form but this is not essential to my invention inasmuch as it may be of other configurations, but it is preferably of closed formation, thus providing a continuous unbroken trackway. The construction of the trackway 1 may be varied, but I preferably construct the rails 2 and 3 from angle iron, one flange being disposed vertically to provide a rail proper and the other horizontally to provide a support and means to secure the rail to the trestles 4.

A plurality of carriages, one of which is indicated generally at 6, is provided, each comprising generally a bed 7 preferably constructed from metal and in the form of a hollow rectangular frame providing an interior perforation or opening therethrough, 8. On its underside the bed 7 is provided with a plurality, such as four, wheels 9—9 by which the carriage is adapted to roll on the rails 2 and 3.

A cover 10, preferably formed from sheet metal, rests upon the bed 7, covering the perforation 8, and has depending side flanges 11 and 12 overlapping the side edges of the bed, and a pair of pins 13—13 projecting through vertical slots 14—14 in the flange 11 and into the bed 7, cooperating with a single pin 15 projected through a single vertical slot 16 in the flange 12, retain the cover 10 on the bed 7 and guide it to move vertically relative to the bed for a purpose to be described.

For each of the carriages 6 I provide a molding flask and a pattern. The flasks are preferably of the snap-flask type and in the practice of my invention illustrated in the drawings, the pattern is of the match-plate type. The complete carriage equipment is illustrated in Fig. 20, the parts being viewed in side elevation, and besides the carriage, of which only the cover 10 appears in the drawings, there is shown the drag flask 17, the cope flask 18 and the match-plate pattern 19, these parts being generally illustrated in the form in which they are commonly used in founding practice.

Each of the carriages 6 and its flask equipment and pattern equipment, just described, is propelled successively to a number of stations around the trackway 1 at which molding operations to be described are performed. To start, the progressive movement of the carriages may be considered as beginning when the carriage is in the position indicated in broken lines at 20, Fig. 1. At or adjacent the station 20, a supply of follow boards 21 is provided, and as the carriage starts on its progressive movement from the station 20, a follow board 21 is laid on or in the flask ready for use.

The carriages are moved from one station to another by the operators, a number of whom are necessary, some of whom may preferably stand within the trackway 1 and others outside the same.

Starting from the station 20, the carriages first move to the station indicated at 22. Immediately above this station is a hopper 23 in which is stored for use a quantity of molding sand or like material which has previously been conditioned and screened ready for use in the making of a mold. The lower end of the hopper 23 as shown in Fig. 5 is normally closed by a gate construction comprising a pair of gates, one of which is illustrated at 24 adapted to be operated by a lever 25 disposed above the station and within convenient reaching distance of the operator at that station. Upon operation of the lever by the operator, the gates are displaced and sand may flow from the hopper.

The exact construction of the gates and of the lever mechanism for operating them forms no essential part of my invention and may be of a form well known in the prior art.

Before operating the lever 25, the carriage is moved on the trackway 1 to position the flask directly under the spout 26 of the hopper. Upon operating the lever 25, sand will fall from the spout filling the drag flask 17. When sufficient sand has been dropped into the flask, the operator shuts off the flow by the lever 25 and lays on top of the sand in the flask the follow board 21 above referred to. The parts then appear as in Fig. 7, the carriage and its flask being supported by the wheels 9 on the rails, the rail 3 only in this figure being shown.

At the station 22 the carriage and flask are accurately disposed directly over a mechanism known in the founding art as a jolter, presently to be described, and directly under the spout 26, by the following stop means.

A bar 27 (see Fig. 13), pivoted at an intermediate part upon a support 28 secured to one of the trestles 4, has confronting shoulders 29 and 30 at opposite end portions thereof. Springs 31—31 which may be of the flat leaf type are secured at one end to a rail and at the other engage opposite ends of the bar 27 on the underside thereof and may hold the bar normally in a horizontal position. The approach end of the bar adjacent the shoulder 29 has an inclined surface 32. The shoulders 30 and 29 are spaced approximately equal to the length of the carriage bed 7 and the bar body proper at an elevation which will be cleared by the bed.

In the operation of the stop device thus far described, when the carriage is moved toward the exact position at which it is to be stopped, the leading end of the bed 7 will engage the inclined surface 32 of the bar and rock the bar clockwise, permitting the bed to pass over that end of the bar, correspondingly compressing the spring 31. By further movement of the carriage, the said end of the bed engages the stop 30 and is stopped thereby. At this moment the spring 31 raises the approach end of the bar and raises the shoulder 29 to a position opposite the corresponding end of the bed so that the bed is trapped between the shoulders 30 and 29 against movement on the trackway in either direction. When it is desired to move the carriage to the next stop station, the bar 27 may be rocked by hand counter-clockwise to depress the shoulder 30 below the bed and then the carriage may be moved by hand to the next station.

The stop device which stops the carriage at the position 22 directly under the spout 26 of the hopper 23, as shown in Fig. 5, positions the carriage directly over a jolter mechanism not shown in Fig. 5 but illustrated in Fig. 7, whereby after the drag flask 17 has been filled as illustrated in Fig. 5 and the follow board 21 applied thereto, the sand in the flask may be jolted, the parts immediately prior to the jolting operation appearing as in Fig. 7.

A preferred construction of jolter is more completely described in the above-mentioned pending application, and as stated therein, may be a jolter of well known construction but having certain novel features. A brief description herein, therefore, will suffice.

A jolter head 35 may be rapidly elevated and then depressed against a rigid stop by mechanism not shown to effect the well known jolting operation. A supplemental head 36 is associated with the head 35 and movable from a depressed to an elevated position as illustrated respectively in Figs. 7 and 6. In the depressed position of Fig. 7, the supplemental head and its associated parts occupy a position sufficiently low that the parts of the carriage may straddle the same to pass thereover upon movement through the station. In the elevated position of Fig. 6, the supplemental head is raised upwardly through the aforementioned perforation or opening 8 in the bed 7 and into engagement with the underside of the cover 10 upon which the flasks rest, and by further movement elevates the cover and the flask above the bed 7, as shown in Fig. 6.

In this position, the flask is supported entirely independently of the bed and therefore of the trackway and the carriage proper. The weight of the flask and associated parts as well as the shock of the jolting operation is transmitted through rigid cam lobes 37 to the head 35.

In the above-mentioned patent, a head similar to the supplemental head 36 engages the lower side of the flask directly to elevate it above the carriage in order to jolt it without transmitting the jolting shock to the trackway. In the form of the instant application, the supplemental head 36 engages the movable cover upon which the flask rests. Thus in the instant form, it is not essential that the flask be exactly centered over the perforation in the carriage bed inasmuch as the entire cover is elevated and the flask will be elevated with it whether the flask itself is accurately positioned or not. Furthermore, the cover 10 serves as a shield to protect the working parts of the jolter from accumulation of sand thereon which may not be collected and retained in the flask.

At the completion of the jolting operation, and after lowering the cover 10 and the flask upon the carriage, and after operation of the lock bar 27 above described to release the carriage, the carriage and flask are moved along the trackway to the position indicated in Fig. 1 at 38.

Either at the station 22 or at the station 38, or at an intermediate point on the trackway, an operator picks up the two parts of the flask and turns them upsidedown on the carriage bed or cover and the parts then appear as in Fig. 8. At the station 38 another hopper 39 having a spout 40 (Fig. 8), gates indicated at 41 and an operating lever 42, is provided. The lever 42 is operated to drop sand into the cope flask as shown in Fig. 8. A stop device as above described may be employed at this station to position the flask under the spout 40 if desired. The carriage and flask are then moved along the trackway to a station indicated at 43 in Fig. 1, where by means of the described stop device, the carriage is stopped and positioned directly over the plunger of a machine known in the art as a squeezer.

The squeezer is indicated fragmentarily in Fig. 9 and comprises a vertically reciprocable head 44, a piston 45 and a cylinder 46, and a stationary upper head 47. By mechanism not shown, the head 44 may be elevated by pneumatic or hydraulic pressure to press the flasks between the head 44 and 47 in a manner to be described.

The mechanism for applying power to the squeezer may be of any known or suitable construction. One form is more completely described in the above-mentioned copending application and need not be further described here.

Immediately before performing the squeezing operation, a sprue mold board 48 is placed upon the sand in the cope flask 18, the board preferably being provided with a sprue pattern 49.

The head 44 of the squeezer is normally at a depressed position sufficiently low that the carriage may travel thereover. The head 44 is of such size that it may be thrust upwardly through the opening 8 in the bed 7 of the carriage. Upon operation of the squeezer, the head 44 is elevated by power upwardly through the opening 8 and engages the cover 10 upon which the flask rests and carries the flask upwardly finally squeezing the sand in both parts 17 and 18 of the flask between the boards 48 and 21 for the usual mold-squeezing purposes. The head 44 is then lowered, returning the cover 10 to the carriage bed 7 and the stop device as above described may then be operated and the carriage moved away from the station 43 to a station indicated at 50 in Fig. 1.

The sprue mold board 48 is removed after the squeezing operation and the parts then appear as in Fig. 10. Preferably a small supply or pile of sprue mold boards 48 is provided as at 51, Fig. 1, from which pile a board may be taken to be put on the flask just prior to the squeezing operation and after removing it after the squeezing operation may be returned to the pile 51.

The operations to be performed at the station 50 are those of taking the flask apart, removing the match-plate, putting the flask together again, and then removing the flask, leaving the finished mold on the follow board 21 upon which it is supported and carried away to be laid in line with other molds ready to be cast. In performing these operations, I preferably apply a vibrator or stripper to the match-plate to vibrate the same and while being vibrated the cope flask 18 is lifted off of the pattern 19 and then the pattern is removed and the cope flask restored to its position on the drag flask and the two flasks preferably of the snap type may then be removed.

The sprue mold pattern 49 leaves a sprue mold 52 and the sprue mold may be completed in the usual manner by removing the sand between it and the mold proper. This may be done before the pattern is removed if desired.

The vibrating or stripper device may be of any preferred form. One form is more completely described in the above-mentioned patent and need only be briefly described herein. It comprises a housing 53 connected to a source of compressed air and containing mechanism for rapidly vibrating it. A hook 54 of the vibrating device is adapted to be inserted in a perforation 55 in a portion of the match-plate extending outwardly from the flask. The housing 53 may be grasped by one hand of the operator who lifts the pattern from the sand.

After the two parts of the snap flask have been removed from the mold, it appears generally as in Fig. 21 supported upon the follow board 21 and may be carried away. The two parts of the flasks 17 and 18 and the pattern 19 may now be assembled, as illustrated in Fig. 20, and placed upon the carriage, and are ready to progressively move around through a second cycle of operations such as those just described.

In the foregoing description and in the drawings I have not shown or described means for conditioning the sand nor for elevating it to and depositing it in the hoppers 23 and 39. Apparatus well known in the founding art has been provided which may be employed for this purpose.

The above described circulating movement of the follow boards 21 and sprue mold boards 48 is illustrated diagrammatically in Fig. 22. A large supply or a continuous supply of follow boards 21 is provided, as for example in a pile, at 57 which may be on the floor or on a suitable table adjacent the station 22. These boards enter the system at that station and travel on the course indicated by the line of arrows 58, passing through the squeezer station 43 and out of the system at 59. The sprue mold boards 48 may be disposed in a suitable pile on the floor or on a table at 51 and enter the system at the squeezing station 43 moving along the course illustrated by the arrows 60 and returning immediately to the pile 51. Thus only a few sprue mold boards 48 are needed and may conveniently have secured thereto a part of the sprue mold pattern 49 above described.

Another system of movement for the boards may be that indicated diagrammatically in Fig. 21 and which corresponds more nearly to the system of movement of boards set forth in the above-mentioned pending application; and is described here to clearly show the improvement of the movement described in the instant application. A pile of sprue mold boards 48, as indicated at 51, is disposed near the squeezing station 63 and the boards enter the system at this point; and after passing through the squeezer, follow the course indicated by the arrows 65 and are employed as follow boards at the jolting station 22, continuing around the course as indicated at 62, passing through the squeezer station 63 and leaving the system at 64. With this movement, the boards 48 function first as sprue mold boards and then as follow boards and such boards are not as economical to provide; furthermore, either the sprue mold pattern must be removable therefrom as described in the above-mentioned patent, or, if made permanent upon the boards, will be subject to rapid deterioration in the handling of the boards for other purposes than as sprue mold boards.

Where the molds being made require the setting of cores therein, this may be done at the station 50 while the mold is in disassembled condition if the core-setting operation is relatively simple and requires only a relatively short time, or the molds may be moved to points farther around the elliptical trackway 1 on the way toward the starting station, and the cores set at such points. But where the core-setting operation is difficult and slow, it would slow up the entire system if performed at the station 50, or on the main trackway 1, and for such cases the following means is provided. A branch trackway 70 is disposed within the continuous trackway 1 and sections 71 and 72 of the trackway 1 are mounted upon turntable devices, Figs. 2 and 3, and after the mold has been separated as described in connection with Figs. 10 and 11, the two parts of the mold are laid upon the section 71 and the turntable is turned to dispose the section 71 in the position indicated at 73; the carriage is then moved from the turntable section 71 to the stationary section 70. The section 70 may be long enough to accommodate one or any suitable number of carriages with molds thereon and apparatus may be stationed suitably to set cores in the molds. After the cores have been set, the core setters may assemble the molds and move them from the stationary section 70 to the section 72, the latter having been rotated on the turntable device to the position indicated at 74, and then the section 72 may be turned around to dispose it in the solid line position, and the carriage may then be returned to the system to make another mold. The finished mold with the cores therein may be removed from the system either from the section 72 in its rotated position 74 or after it has been turned to the main line position.

In some instances the core-setting operation may take so much time that other branch sections such as the curved section 75 may be necessary and it may be supplied with carriages carrying molds from the turntable section 71; and the carriages may be transferred therefrom by the turntable section to the main trackway as described for the stationary section 70.

Thus the stationary branch sections 70 and 75 and others which may be added, provide an accumulating capacity for the system through which the molds may travel relatively slowly while difficult core-setting operations are being performed and numerous operators may be provided adjacent the branch sections to set the cores. Thus difficult core-setting operations may be performed without slowing up the rate of progress of the carriages through the mold-making part of the system.

Any suitable turntable construction may be provided for the sections 71 and 72. One form is illustrated in Figs. 2 and 3 for the section 71. The track section 71 is mounted upon a head 76 supported upon a plurality of rollers 77 rolling upon a circular trackway 78. Thus the head 76 may be turned upon a vertical rotational axis and dispose the trackway section 71 in any angular position relative to the main trackway 1. If desired, a stop bar 79 having shoulders 80 and 81 and pivotally mounted upon a support 82 may be provided to index or position the turntable at predetermined angular positions, such for example as positions to register or align with the branch track sections 75 and the like.

The operation of the bar 79 may be similar to that described for the bar 27 hereinbefore.

As illustrated in Figs. 2 and 3, the bar 79 is pivoted intermediate the arms of the U-shaped support 82 and in a position extending transversely of the rail 71 mounted upon the rotatable head 76. Thus, in rotating the turntable from the position indicated at 73 to the position indicated in full line and in which position the rails are in alignment with the main continuous trackway 1, the rotatable head 76 as it is rotated counter-clockwise as viewed in Fig. 1 will first engage the shoulder 81 of bar 79 depressing the engaged end of the bar, whereby the head may ride thereover. The head 76 will be continued to be rotated until it engages the inner face of shoulder 80 at the opposite end of the bar whereby due to the spring means affixed to bar 79, the bar will be forced to a normally horizontal position and grip and maintain the edges of head 76 by the inner faces of the shoulders 80 and 81 and in aligned relation with the continuous trackway 1.

When it is desired to disengage the turntable from this position, an end of bar 79 is manually depressed and the head 76 is rotated to ride over the depressed stop and upon being rotated a sufficient distance the bar 79 will assume a position whereby it may again lockingly engage the head 76.

Similar bars may be provided to lockingly maintain the turntable in any desired angular position.

Where the branch track section 70, 75 and the like are employed, a modification of carriage may be provided if desired, as illustrated in Fig. 17. This carriage has a longer bed as indicated at 85 and in one end portion has the rectangular opening 8 and the cover 10 thereon for the purposes above described. When the mold is laid in two parts for core-setting purposes, one part may be laid on the cover 10 and the opposite end portion of the bed 85 may support the other half of the mold.

Where delayed core-setting operations are not necessary, the pattern, as above described, is re-assembled with the flask parts as in Fig. 20 and returned to the start of the system by moving the carriage around the trackway. Where core-setting is done on the branch trackways 70, 75 and the like, it may be preferable to transport the pattern directly across the trackway so as not to encumber the carriage with it while the carriage is going through the delayed core-setting operation. The pattern may be re-assembled with the flask after the poured mold has been removed therefrom on the opposite side of the trackway. In Fig. 12 one suitable construction of pattern transfer mechanism is illustrated.

A central column 90, which may be disposed within the trackway, supports a cross-head 91 at the opposite ends of which are mounted belt pulleys 92—92, the cross-head 91 being preferably inclined. A belt 93 runs over the pulleys and is provided with a plurality of hook devices 94—94 suitable to be hooked through the perforation 55 in the match-plate or in one of the perforations 95 (see Fig. 11) by which the match-plate is aligned with the halves of the flasks. The higher of the two pulleys 92 may be disposed over the station 50, and the lower pulley over a portion of the trackway diametrically opposite. The operator, upon removing the pattern from the flash, may hook it over one of the hook devices 94 and by gravity it will be transferred to the opposite side of the trackway where it may be picked off by the operator to assemble it with the two halves of the flask from which the poured mold has been removed.

In Figs. 18 and 19 is illustrated the application of my invention to the making of molds when it is desired to both jolt and squeeze both halves of the mold. In such case the pattern is made in two halves, 96 and 97. The half 96 may be laid upon the cover 10 of a carriage as shown in Fig. 18 and at the station 22, Fig. 1, may be filled with sand and jolted, as described hereinbefore. This may be considered as the drag flask. Another flask, the cope flask, having another pattern half 97, may be filled and jolted upon another carriage at the station 22 and then one may be placed upon top of the other with the two halves of the pattern juxtaposed, and the parts will appear as in Fig. 19. The carriage supporting both halves may now be moved to the squeezing station 43 where the complete flash may be squeezed as indicated in Fig. 19. From this point on, the operation may be the same as that hereinbefore described.

It may be desirable in such cases also to employ a carriage similar to that illustrated in Fig. 17. One half of the mold may be jolted on the cover 10 and then transferred to the opposite end of the carriage while the second half is being jolted. It will be observed that the first half will not be jolted by jolting the second half because the carriage upon which it rests is not subjected to the jolting operation. Then both halves may be moved along with the carriage of Fig. 17 to the squeezing operation.

Where the difficult core-setting operations hereinbefore referred to are not necessary, the main trackway may be circular instead of oval as indicated in Fig. 1, because the turntable track sections 71 and 72 will not be needed and because it is preferable to have these sections straight when they are employed. A circular trackway of this general form is illustrated in the above-mentioned patent.

Where the maximum of productive output for the minimum of floor space is desired, a plurality, such as three or four, complete trackway systems may be provided disposed adjacent each other and all supplied from a common sand supply. One arrangement of such a plant is indicated in Fig. 23. Here, four trackways 100—100 are indicated of circular form although the elliptical form may be employed as desired and as will be understood. A main sand hopper 101 is mounted at an elevation above the plane of the trackways. A pair of spouts 102 and 103 conduct sand from the main hopper to the stations 22 and 38 for jolting and squeezing operations as in Fig. 1. The pair of spouts 102 and 103 may be provided at each of the four corners of the hopper 101.

In Figs. 24 and 25 is illustrated one method of controlling the flow of sand from the main hopper 101 to the spouts 102—103 whereby either of the trackway systems 100—100 may be cut off from use or brought into use at will.

The sand control comprises a shutter 104 in each corner of the hopper 101 through which sand to the spouts 102—103 must flow. The shutter 104 may be closed or open optionally by an operator standing on the floor under the hopper. To this end, an operating rope or chain 105 may be pulled upon to rotate a pulley 106 to which is connected a connecting rod 107 having pivotal connection as at 108—108 with each of the vanes 109—109 of the shutter. Upon pulling downwardly on one of the flights of the chain 105, the pulley 106 will be rotated in the direction to close the shutters and the pulling downwardly upon the other flight of the chain the shutters will be opened in a well known manner.

The hopper 101 may have the floor thereof in the form of a four-gable roof by inclined floor portions 110—110 whereby sand in the hopper will be automatically directed into the four-shuttered outlets 104—104.

My invention is not limited to the exact details of construction shown and described. Many changes in and modifications of the embodiment hereinbefore set forth may be made within the scope and spirit of my invention without sacrificing its advantages.

I claim:—

1. In an apparatus for making molds, a plurality of molding flasks provided each with a pattern and a supporting carrier therefor, a closed guideway along which the carriers are adapted to travel processionally, a plurality of pieces of operable apparatus disposed serially along the guideway, whereby a plurality of operators stationed along the guideway may perform on the successive flasks successive mold-producing operations, the closed guideway having a main portion and a plurality of branch portions diverging from and reuniting with the main portion, and means for selectively guiding the carriers and molds thereon from the main portion to one or another of the branch portions to permit the carrier movement to be delayed on the branch portions to allow time for a core-setting operation, without delaying movement of the carriers and molds on the main portion of the guideway, and means for guiding the carriers and flasks from the branch portions to the main portion whereby each carrier with a flask may be returned to the starting point on the main portion from a branch portion and means for transferring the pattern directly from the mold to a flask after the flask leaves the branch portion.

2. In an apparatus for making molds, a plurality of molding flasks provided each with a pattern and a supporting carrier therefor, a closed guideway along which the carriers are adapted to travel processionally, a plurality of pieces of operable apparatus disposed serially along the guideway, whereby a plurality of operators stationed along the guideway may perform on the successive flasks successive mold-producing operations, the closed guideway having a main portion and a plurality of branch portions diverging from and reuniting with the main portion, turntable means for selectively guiding the carriers and molds thereon to one or another of the branch portions from the main portion to permit carrier movement to be delayed on the branch portions to allow time for a core-setting operation, without delaying movement of the carriers and the molds on the main portion of the guideway and turntable means for guiding the carriers and flasks selectively from the branch portions to the main portion, whereby each carrier with a flask may be returned to the starting point on the main portion from a branch portion, means for transferring the pattern directly from the mold to a flask after the flask leaves the branch portion, and means for automatically positioning the turntable means in alignment with the guideway on the main portion and branch portion respectively.

3. In a molding apparatus, a plurality of carriers, a plurality of guideways upon each of which a plurality of the carriers may travel in a closed path of movement processionally, a flask and pattern for each carrier, whereby a plurality of operators stationed along each guideway may perform on the successive flasks and patterns successive mold-producing operations and return the carriers with the flasks and patterns to a starting point of travel, a sand hopper and a plurality of spouts for conducting sand from the hopper to points along the several guideways at which flask-filling operations are performed, and operable means for controlling flow of sand from each spout.

4. In a molding apparatus, a plurality of carriers, a plurality of guideways upon each of which a plurality of the carriers may travel in a closed path of movement processionally, a flask and pattern for each carrier, whereby a plurality of operators stationed along each guideway may perform on the flasks and patterns successive mold-producing operations and return the carriers with the flasks and patterns to a starting point of travel, a sand hopper and a plurality of spouts for conducting sand from the hopper to points along the guideways at which flask-filling operations are performed, operable means for controlling flow of sand from each spout, and operable means for independently controlling the flow of sand from the hopper to each spout.

5. In an apparatus for making molds, a trackway, a carriage adapted to support a flask to convey it along the trackway for performance on the flask of successive mold-making operations, the carriage comprising a frame having trackway engaging supporting wheels, a frame cover upon which a flask may be supported, guide means on the frame and cover for retaining the cover on the frame and permitting vertical movement relative thereto, and an opening in the frame under the cover whereby the cover and a flask thereon may be lifted from the frame by means moving upwardly through the frame.

6. In an apparatus for making molds, a trackway, a carriage adapted to support a flask to convey it along the trackway for performance on the flask of successive mold-making operations, the carriage comprising a frame having trackway engaging supporting wheels, a frame cover upon which a flask may be supported, guide means on the frame and cover for retaining the cover on the frame and permitting vertical movement relative thereto, and an opening in the frame under the cover whereby the cover and a flask thereon may be lifted by means acting upwardly through the frame, and means for reciprocating the lifting means to effect a jolting operation on the flask while in the lifted position.

7. In a mechanism comprising a trackway and a carriage movable thereon in either direction, a stop device associated with the trackway for positively stopping and positioning the carriage thereon comprising an oscillatory element having a first and a second abutment thereon spaced in the direction of movement of the carriage and adapted to embrace spaced portions of the carriage to stop movement of the carriage, means tending to rock the element in one direction, yielding means yieldably opposing said rocking movement and normally holding the oscillatory element in a carriage stopping position, the element having a portion engageable by a portion of an approaching carriage to effect rocking of the element in the other direction to permit the said spaced carrige portion to ride over the first abutment and to be disposed between the two abutments, the oscillatory element being yieldingly rockable in the first said direction to displace the second abutment and permit the carriage to continue movement.

JOHN LUTON.